Figure 1:
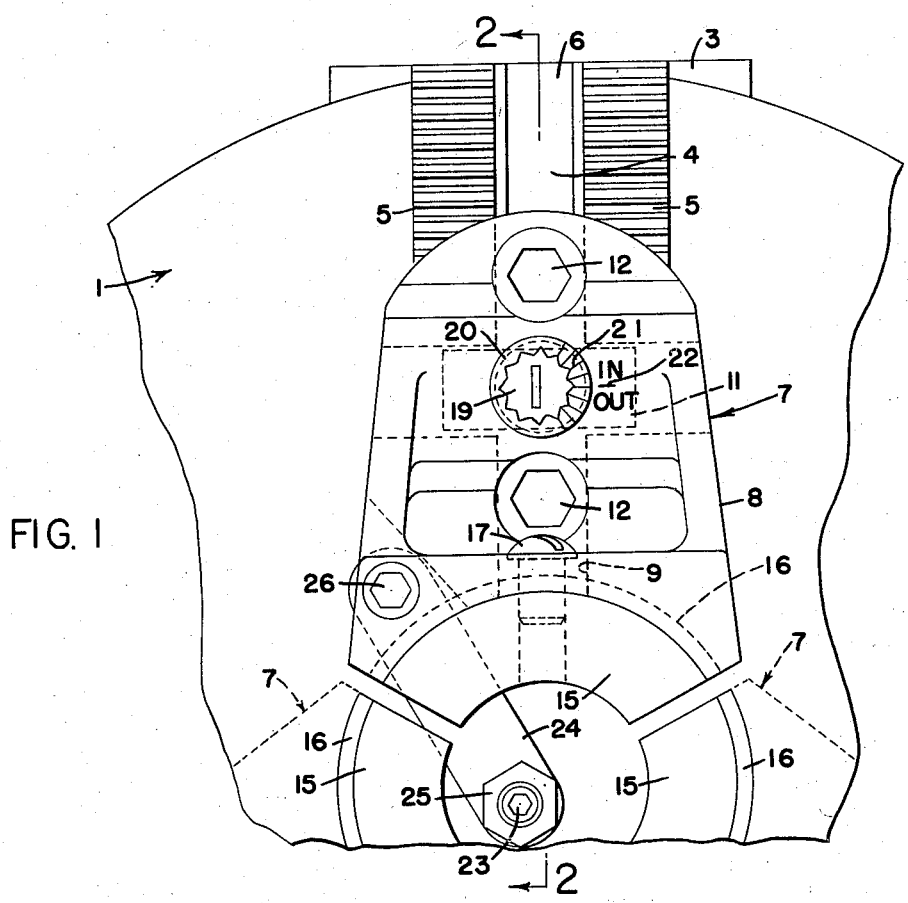

Jan. 20, 1959   H. L. ETCHELL   2,869,884
CHUCK

Filed Feb. 21, 1957   2 Sheets-Sheet 1

INVENTOR.
HOWARD L. ETCHELL
BY
Oberlin + Limbach
ATTORNEYS

Jan. 20, 1959     H. L. ETCHELL     2,869,884
CHUCK

Filed Feb. 21, 1957     2 Sheets-Sheet 2

*INVENTOR.*
HOWARD L. ETCHELL

BY
*Oberlin & Limbach*
ATTORNEYS

United States Patent Office 2,869,884
Patented Jan. 20, 1959

2,869,884

CHUCK

Howard L. Etchell, Walton Hills, Ohio, assignor to Bedford Gear & Machine Products, Inc., Bedford, Ohio, a corporation of Ohio Application February 21, 1957, Serial No. 641,609

7 Claims. (Cl. 279—123)

The present invention relates generally as indicated to a chuck and more particularly to a so-called "soft" jaw chuck that is commonly used on second operations wherein work is gripped on a finished diameter.

By way of background, most jaw chucks are equipped with master (or bottom) jaws to which top jaws are mounted, the latter gripping the work and the former being movable radially in and out in the chuck body as by means of a geared scroll (universal chuck), by means of screws (independent jaw chuck) by means of mechanically or pneumatically actuated dogs or cam levers, etc. Several schemes for mounting said top jaws to said master jaws are well-known in the art, for instance, criss-cross tongue and groove mounting, axial slip mounting, and serrated mounting, the present invention being primarily concerned with the last-mentioned expedient. Aside from the different top jaw-master jaw mountings aforesaid, there is a further classification of the top jaws as first operation and second operation jaws, first operation jaws usually being hardened and serrated for biting into the rough surfaces of cast or forged work pieces, and second operation jaws usually being fashioned, as of unhardened steel, and formed with smooth work piece gripping surfaces that are bored or turned to engage finished diameters of the work. Chucks equipped with such second operation top jaws are commonly referred to in the art as "soft" jaw chucks in which the work gripping surfaces of the top jaws accurately fit the turned or bored surface of the work and thus grip the same over a wide area for accurate and firm gripping without marking, as would occur with first operation serrated, hardened jaws.

Where accuracy is required in such second operations, say, to about .002" concentricity, it is necessary to bore or turn the work gripping surfaces of the "soft" jaws periodically under the same pressure as used when gripping the work. Since, in the case of serrated mounting aforesaid, the interfitting teeth of the master jaws and top jaw master keys generally have pitches of ⅛" or more, the truing up operation usually involves loosening of the top jaws sufficient to disengage the teeth and radial shifting of the top jaws in ⅛" steps (or whatever the serration pitch may be), such loosening, shifting and retightening not only being time-consuming, but either requiring removal of considerable metal from the top jaws for truing purposes in order to maintain the master jaw actuators, viz, the scroll, screws or dogs in the same relative positions as before or else requiring shifting of the actuators to new positions relative to the master jaws.

With the foregoing in mind, it is a principal object of this invention to provide a chuck in which serrated mounting top jaws are capable of extremely fine radial adjustment for facilitating truing of the work gripping surfaces thereof with minimum metal removal while preserving the same relative positions of the master jaw actuators as previously.

Another object of this invention is to provide a jaw chuck in which at least one of the top jaws is provided with a novel form of adjustable back stop for engagement with a transaxial surface of the work gripped thereby.

Another object of this invention is to provide a novel form of top jaw that is characterized by its simplicity, and its fool-proof, strong construction.

Still another object of this invention is the provision of a so-called "soft" jaw chuck in which relatively inexpensive, unhardened, arcuate work-engaging pads are detachably mounted on the top jaws, and in which said top jaws, in turn, are securely, but adjustably, mounted on the master jaws.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 3:
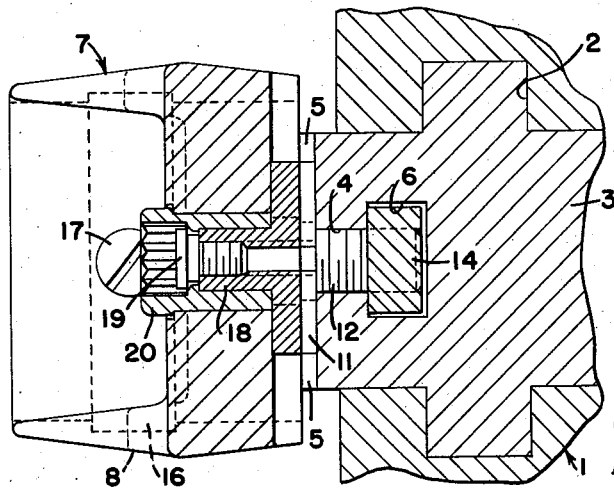
Figure 2:
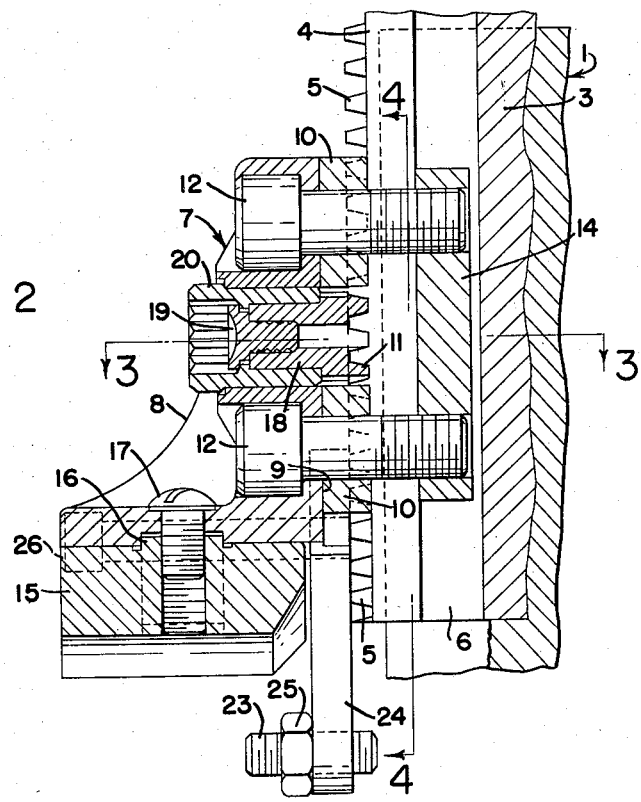
Figure 4:
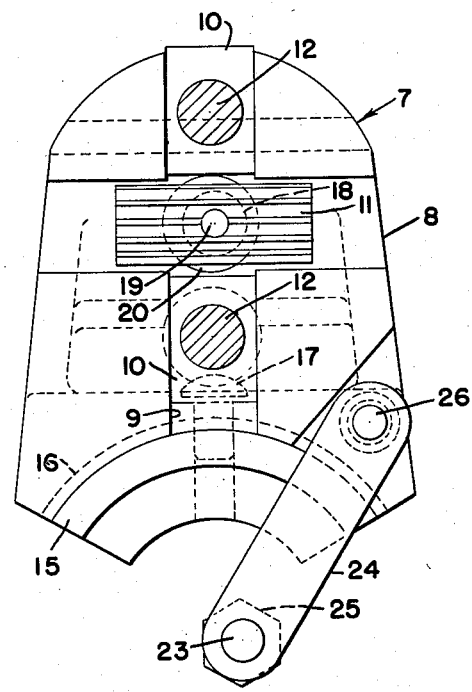

In said annexed drawing:

Fig. 1 is a fragmentary front elevation view of a preferred embodiment of this invention; and Figs. 2, 3, and 4 are cross-sectional views taken respectively along the lines 2—2 Fig. 1; 3—3, Fig. 2; and 4—4, Fig. 2.

Referring now in detail to said annexed drawing, the reference numeral 1 denotes the generally cylindrical chuck body which is designed to be screwed onto or bolted onto a machine tool spindle, said body 1 being formed with a plurality of equally spaced apart (herein three) radially disposed T-slots 2. Radially slidably fitted in the respective T-slots 2 are master jaws 3 that are adapted to be radially moved in or out as by means of a scroll, by means of separate screw means, by means of pivoted levers or dogs (none of which are herein shown), all of which expedients are so well-known in the art as not to require further elucidation. For sake of simplifying the present case, the drawing herein illustrates but one of such master jaws 3, it being understood that any number thereof may be provided, usually three or four.

The front face of each master jaw 3 is formed with a radially extending groove 4 and with transverse, chordwise extending serrations or teeth 5. Each master jaw 3 is also formed with a radially extending T-slot 6 in which the respective "soft" top jaw 7 is radially adjustable in a manner hereinafter described in detail.

Said top jaw 7 comprises an L-shaped body 8 including radially and axially extending portions and made as of forged steel, said body being machined on its rear face to provide a radially extending groove 9 to accommodate rectangular jaw keys 10, the latter extending rearwardly into groove 4 of the master jaw 3 to preclude lateral shifting and turning of said top jaw 7. Said top jaw 7 also carries a master key 11 that is formed with teeth adapted to mesh with teeth 5 of said master jaw 3 whereby relative radial shifting of said top and master jaws is prevented.

Said top jaw 7 is securely clamped in place by bolts 12 that pass through holes in the respective jaw keys 10 and that are engaged with nut 14, said nut being fitted in the laterally enlarged portion of T-slot 6 in master jaw 3. The axially extending portion of said top jaw body 8 has an internal, grooved arcuate surface to receive therein the work gripping pad 15, also of arcuate form and provided with a circumferential rib 16 fitting in the aforesaid body groove as shown. A screw 17 is employed to hold said pad 15 in place.

The master key 11 has an integral, internally threaded cylindrical shank 18 and a retainer screw 19 screwed thereinto which serves to axially retain the cam sleeve 20 thereon. The outside diameter of said sleeeve 20 which is fitted for rotation in body 8 is eccentric with respect to the bore through which shank 18 extends (see Fig. 1) whereby turning of said sleeve 20 in clockwise and counterclockwise directions, with bolts 12 slightly loosened, respectively shifts the top jaw 7 radially outward ("OUT") and inward ("IN") relative to the master jaw 3. Suitable graduations 21 may be provided on said cam sleeve 20 to facilitate accurate adjustment, there being a mark 22 on body 8 with which the graduations 21 may be aligned.

A further feature of the present invention is the provision of a novel form of adjustable back stop which comprises the end of a screw 23 threaded into link 24 and locked in adjusted position by jam nut 25. Said link 24 is pivotally adjustably mounted on body 8 by screw 26 so as to enable lateral positioning screw 23 to be engaged by the work.

In setting up the present invention, pads 15 having approximately the desired inside diameter are mounted by screws 17 on the top jaw bodies 8. The top jaws 7 are then positioned at the same relative positions on the respective master jaws 5 for movement of the top jaws in and out. A chucking disk (not shown) of desired diameter may be positioned with the pads 15 whereupon the chuck may be actuated to grip said disk. If the disk does not run true, it is a simple matter to turn the cam sleeves 20 to move the jaws 7 in or out, as required. If necessary, the internal surfaces of pads 15 may be turned to the diameter of the work to be gripped thereby. Should truing up of the top jaws be subsequently required, this may be quickly and easily accomplished by slightly loosening the bolts 12 and turning the cam sleeves 20 a slight amount in the "IN" direction whereupon the inside diameter of pads 15 may be trued. It is, of course, to be understood that the jaws 7 may be positioned or designed for gripping the interior of a bored workpiece and in that case a chucking ring may be employed instead of the aforesaid chucking disk.

Other modes of applying the principle of the invention may be employed, change being made as regards the details described, provided the features stated in any of the following claims, or the equivalent of such, be employed.

What is claimed is:

1. A jaw for a chuck comprising a body of generally L-shaped form of which one leg is adapted to be secured in radially extending position on a radially movable master jaw of a chuck and has a hole transversely therethrough and of which the other leg is shaped for engagement with a workpiece responsive to radial movement of the master jaw; an axially extending sleeve rotatable in the hole of such one leg and formed with an eccentrically disposed bore and with a wrench-engaging portion at one end; a master key provided with generally chordwise extending teeth that are adapted to interfit with the teeth of the master jaw and provided with a cylindrical extension that extends into the bore of said sleeve whereby, upon rotation of said sleeve by its wrench-engaging portion, said body and master jaw are relatively radially shifted in infinitesmal increments.

2. The jaw of claim 1 wherein said body has mounted thereon an axially adjustable backstop that is carried by said body for adjustable swinging movement in a plane parallel to such one leg.

3. The jaw of claim 1 wherein such one leg is additionally formed with a pair of openings therethrough, wherein a pair of screws extend axially through the respective openings, and wherein a single nut has threaded engagement with said screws, said nut being adapted to radially slidably fit in a T-slot of such master jaw.

4. The jaw of claim 1 in which said other leg has a collet pad of arcuate form detachably secured thereto for engaging the exterior cylindrical surface of a workpiece.

5. A chuck comprising a chuck body; and workpiece gripping jaws relatively radially movably supported by said body; at least one jaw including a master jaw supported as aforesaid by said body; a top, workpiece engaging jaw mounted on said master jaw for radial adjustment relative to said master jaw; a master key having radially fixed and chordwise slidable engagement with said master jaw, and having a cylindrical stem that projects axially therefrom and eccentrically into a hole formed in said top jaw; and an eccentric sleeve rotatably supported in such hole of said top jaw and on said stem whereby turning of said sleeve about the axis of such hole effects fine radial adjustment of said top jaw relative to said master jaw, said sleeve being provided with a wrench engaging portion at its outer end that is accessible directly from the front of said top jaw.

6. The chuck of claim 5 wherein said master jaw is formed with chordwise extending teeth, and wherein said master key is formed with teeth interfitting with the teeth of said master jaw.

7. The chuck of claim 5 wherein said master jaw is formed with opposite parallel, radially extending slots, wherein a single nut is radially movable in one of said slots, wherein top jaw keys are radially movable in the opposite slot and in a slot formed in said top jaw, and a pair of clamping screws extending through said top jaw and said jaw keys on radially opposite sides of said master key and having threaded engagement with said nut to lock said top jaw in such finely adjusted radial position.

References Cited in the file of this patent

UNITED STATES PATENTS

| | | |
|---|---|---|
| 2,488,822 | McDonald | Nov. 22, 1949 |
| 2,569,056 | Highberg | Sept. 25, 1951 |
| 2,667,358 | Highberg | Jan. 26, 1954 |
| 2,687,308 | Highberg et al. | Aug. 24, 1954 |
| 2,777,704 | Sloan | Jan. 15, 1957 |